H. H. CUTLER.
SYSTEM FOR CONTROLLING ONE OR MORE ELECTRIC MOTORS.
APPLICATION FILED AUG. 11, 1905.

903,177.

Patented Nov. 10, 1908.
4 SHEETS—SHEET 1.

H. H. CUTLER.
SYSTEM FOR CONTROLLING ONE OR MORE ELECTRIC MOTORS.
APPLICATION FILED AUG. 11, 1905.

903,177.

Patented Nov. 10, 1908.
4 SHEETS—SHEET 2.

Witnesses:
Inventor:
Henry H. Cutler
By Jones & Addington
Atty's

H. H. CUTLER.
SYSTEM FOR CONTROLLING ONE OR MORE ELECTRIC MOTORS.
APPLICATION FILED AUG. 11, 1905.

903,177.

Patented Nov. 10, 1908.
4 SHEETS—SHEET 3.

Fig. 3.

Witnesses:
Brad P. Perry
M. R. Rochford

Inventor:
Henry H. Cutler
By Jones & Addington
Attys.

UNITED STATES PATENT OFFICE.

HENRY H. CUTLER, OF MILWAUKEE, WISCONSIN, ASSIGNOR TO THE CUTLER-HAMMER MFG. CO., OF MILWAUKEE, WISCONSIN, A CORPORATION OF WISCONSIN.

SYSTEM FOR CONTROLLING ONE OR MORE ELECTRIC MOTORS.

No. 903,177.     Specification of Letters Patent.     Patented Nov. 10, 1908.

Application filed August 11, 1905. Serial No. 273,837.

*To all whom it may concern:*

Be it known that I, HENRY H. CUTLER, a citizen of the United States, residing at Milwaukee, in the county of Milwaukee and State of Wisconsin, have invented new and useful Improvements in Systems for Controlling One or More Electric Motors, of which the following is a full, clear, concise, and exact description; reference being had to the accompanying drawing, forming a part of this specification.

My invention relates particularly to improvements in systems for controlling one or more electric motors, especially those employed for operating trains of cars on the multiple unit plan, although certain features of the invention are applicable to the manipulation of other electrical instrumentalities, and for electric motors in other relations.

In the present system, which has been worked out for practical purposes, there is preferably provided a plurality of switches which may be of the solenoid type, upon each car, these switches serving to control the operation of the driving motors of the cars, and themselves being controlled directly or indirectly by variations of voltage upon the controlling circuit of the train. The arrangement is preferably such that the rise in voltage upon the controlling circuit to a predetermined extent, which is under the control of the operator, results in the operation of certain of the switches to accomplish certain desired results; a further rise of voltage on the controlling circuit to a second predetermined amount, causes the operation of certain of the other switches to accomplish still other results, as for instance, an increase in speed of the train, and a still further rise in voltage upon the controlling circuit accomplishes through the operation of additional switches, still a different result which in connection with a train control system, may be a third speed of the train. In the apparatus of each car, is preferably included a small motor generator, which is driven from the trolley or power circuit. This is therefore subject to the fluctuations of voltage upon the trolley or power circuit and corresponding fluctuations are introduced into said controlling circuit.

It is one object of the present invention to provide means for making the control of the train or plurality of motors, independent of the fluctuations of voltage that may thus occur upon the trolley circuit or upon the controlling circuit. This independence of the fluctuations of voltage that may occur is preferably secured by the provision of means for automatically reducing the voltage upon the controlling circuit after the desired switches or other parts have operated, thereby checking a further rise in voltage, and reducing it to such an extent that it can not be caused to rise above the desired amount by any fluctuations which occur upon the trolley circuit. In addition to this independence of control which is thus secured, an economy in the amount of current consumed by the various electro-magnetic-devices also results; damage to such parts is prevented by overheating, and the necessity for the so-called lamp switches or protecting devices, is eliminated. In addition, smaller motor generator sets may be employed for the reason that they are called upon for their maximum output, only during possibly a second of time which is consumed in building up the voltage of the controlling circuit to the desired extent to operate the different sets of devices.

Still another object of the invention is to simplify the circuits and apparatus generally, and to reduce the controlling circuit to one wire only, called the "train wire", running from car to car throughout the train, and which admits of the use of simple automatic couplers at the ends of the cars. The arrangement is preferably such that the direction of the flow of current in the train wire controls the direction of movement of the train, from which it follows that it makes no difference which way the cars are coupled end to end, since if the car is taken off from the train and turned around it will still tend to run in the same direction as the remainder of the train, because the current will then be going in the opposite direction in the train wire. The rail is preferably used as a return conductor for all circuits including the driving motors, the motor generator sets, the solenoid switches, etc.

Further objects and advantages will appear from the detailed description and claims.

Fig. 2 is a similar view of the solenoid switches and their connections for variously connecting the motors in different circuit relations;

and for controlling the same.

Figure 1:
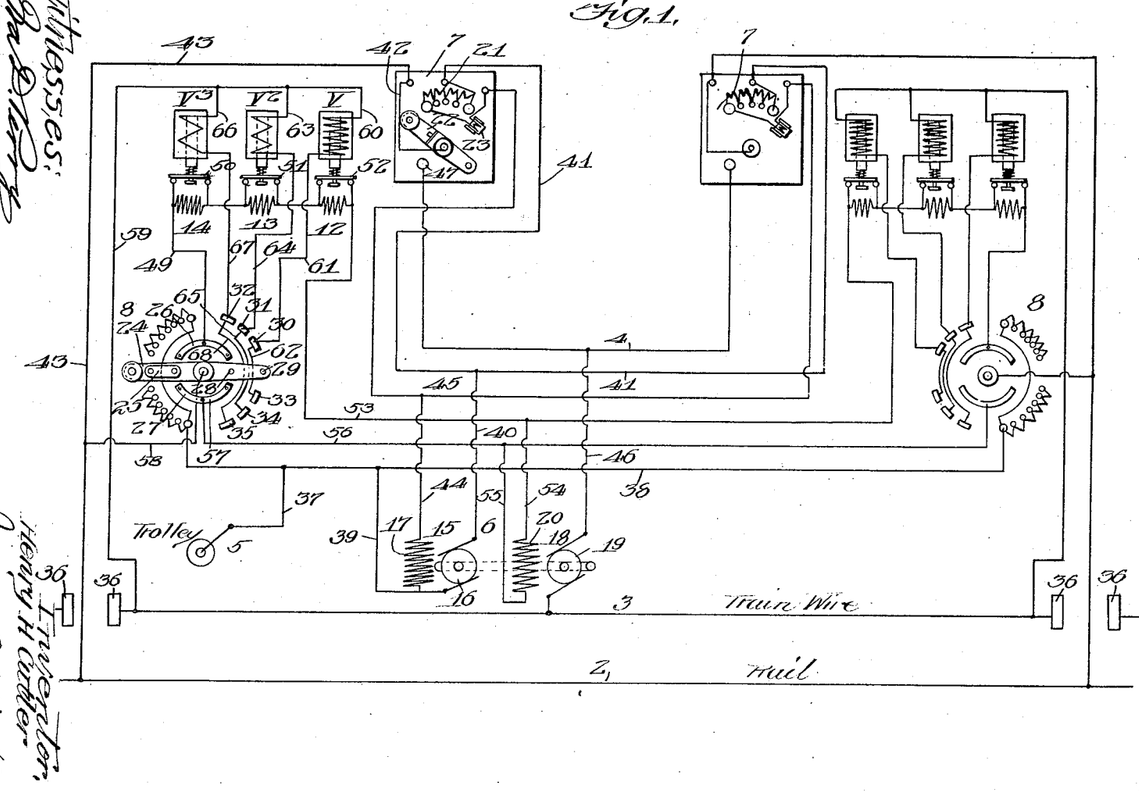
Figure 1 is a diagrammatic view of a portion of the system and apparatus utilized for controlling the motors of the train wire.

In Fig. 1, 2 indicates the rail through which the return circuits are completed; 3, the train wire; 4 the car wire, and 5, the trolley. A motor generator 6 is located upon each car and provision is made for operating the same from either end of the car. The train wire together with the rail constitute the controlling circuit. This mechanism includes a hand starting-box 7, a master-controller 8, suitable voltage regulators V, $V^2$ and $V^3$, in the form of solenoid switches controlling respectively suitable resistances 12, 13 and 14. The motor-generator 6 includes a motor 15 at the left, provided with an armature 16, and a shunt field winding 17, and a generator 18 at the right having an armature 19 and shunt-field-winding 20. The starting-box 7 includes the usual rheostat 21 having its sections connected to suitable contact buttons upon the face of the rheostat, and a lever 22 adapted to be moved clockwise over the said contact buttons in order to initially include the resistance sections in the circuit, and an automatic release or under-load magnet 23, adapted when energized to maintain the hand-lever or arm 22 in position upon the last contact of the rheostat, and when deënergized to permit said lever to return to normal position as shown in the drawing under the influence of a suitable spring as is common practice. The master-controller 8 includes a pivoted lever 24 adapted to be rotated in either direction, and having an insulated contact 25, one end of which is provided with a brush adapted to engage with the series of resistance controlling contact buttons upon either side, and the other end of which is provided with a similar brush adapted to engage either the segmental contact strip 26 or 27 at one side or the other of the lever. Other brushes 28 and 29 are carried by the opposite end of the controller-lever 24 and are not insulated therefrom. The inner brush is adapted to engage either the contact strip 26 or 27 in the movement of the lever while the outer brush 29 engages successively the contacts 30, 31 and 32, when moved in one direction or the similar contacts 33, 34 and 35 when moved in the opposite direction. When released from the hand of the operator, said lever preferably returns to the position shown in the drawing,—its normal position—under the influence of a suitable spring. Similar parts are provided for the opposite end of the car and since the connections are the same for each end, are not separately described. The pivoted levers of both the starting-box 7 and the controller 8 at the opposite end are omitted for the sake of clearness.

Since the entire control of the train, both as to speed and direction of travel is secured from the train wire 3, it is the only wire of the various connections upon the car that is required to be connected throughout the train, and hence it is provided at each end with means for connecting it with the similar wires of the other cars in the train. Such means is preferably in the form of an automatic coupling 36 of any desired type and which may be readily and conveniently used in view of the fact that only the ends of this one wire are to be connected.

Figure 5:
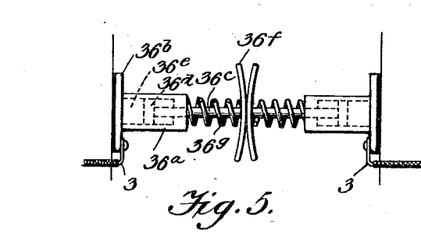
Fig. 5 is a view of an automatic coupler for connecting train wires of various cars.
Figure 6:
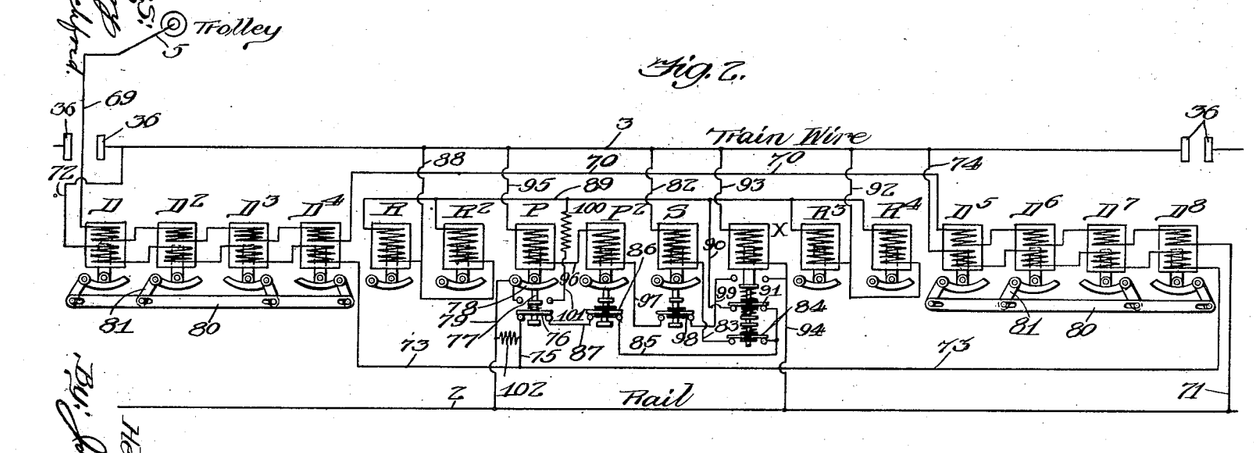

I have illustrated one form which this automatic coupler may take in Fig. 5, in which a tubular support or bracket $36^a$ is shown as being mounted upon the end of each car, suitable insulation $36^b$ being interposed between the bracket and the car to insulate the bracket therefrom, and from the ground. A longitudinally sliding rod $36^c$, provided with a collar $36^d$ at its inner end operating in the enlarged opening $36^e$ in the bracket to prevent the rod from being displaced, is carried by said bracket and has mounted upon its outer end an arc-shaped contact $36^f$. The rod is yieldingly pressed outward by a coiled spring $36^g$ interposed between the bracket and the head. The end of the train wire 3 is connected to the bracket and when the cars are together, the heads or contacts $36^f$ press against each other and thus connect the train wires.

The voltage and direction of current upon the train wire 3, as well as the automatic reduction in voltage upon the train wire are controlled in the following manner. The closure of the switch of the starting-box 7 results in completing the circuit of the motor 15 of the motor-generator 6, the circuit of which may be traced from the trolley 5, via conductors 37, 38 and 39, armature 16 of the motor, conductors 40 and 41, thence through the resistance of the starting-box 7, lever 22 thereof, conductors 42 and 43 to the rail 2. A path for current is also completed through wire 39, through the shunt field 17, conductors 44 and 45, thence through automatic release magnet 23, and lever 22 to wires 42 and 43 leading to the rail. This operates the motor 15 to drive the generator 18, the armature of which is connected upon one side with the train wire 3, and upon the other side by conductors 46 and 4, with the contact 47 upon the starting box 7, with which the brush $47^a$ at the lower end of the starting-lever 22 engages when said lever is in its full operating position. From this point, the lever is connected as before explained with the rail 2 of the track. The circuit of the field winding 20 of the generator 18 is, however, at this time open, and no current is being generated by the motor-generator.

The lever of the master controller is now rotated in one direction or the other, according to the direction that it is desired to move the train. Assuming that it is rotated clockwise, a path for current through said field winding 20 of the generator is established as follows: from the trolley 5, conductors 37 and 38, wire 48, the resistance of the controller 8, contact 25, upon the lever of the controller, contact 26, wire 49, short-circuiting contacts 50, 51 and 52 of the voltage controllers $V^3$, $V^2$ and V, wire 53, conductor 54, thence through winding 20 of the generator, conductors 55 and 56, contact 27 of the master controller, brush 28 of the lever 24, thence through the lever to the hub thereof, and by way of conductors 58 and 43 to the rail 2. The field magnetism now builds up and as the generator is rotating, current is impressed upon train wire 3.

The voltage regulators V, $V^2$ and $V^3$ are adjusted to respond to the different voltages of current flowing through their windings, the regulator V being adjusted for the lowest desired voltage, and regulator $V^2$ at the next higher desired voltage and regulator $V^3$ at still a higher voltage. As soon as the lever 24 of the master controller is rotated far enough so that the brush 29 engages the contact 33 a path for current is completed from one side of the generator armature 19 by means of said train wire 3 over conductors 59 and 60, thence through the winding of the voltage regulator V, thence by way of conductors 61 and 62, the contact 33, brush 29 of lever 24, thence through the lever to the hub and by way of wires 58 and 43 to the starting-box 7, wire 42, lever 22 and contact 47 of the starting-box, thence by wires 4 and 46 to the other side of the generator armature 19. The voltage in this path now immediately builds up sufficiently to energize the voltage controller V which lifts its short-circuiting contact 52, thereby cutting the resistance 12 into the circuit of the field winding 20 of the generator 18, this resistance being of sufficient amount to prevent further rise, and in fact, considerably cutting down the voltage impressed upon the train wire 3 by the generator 18. Sufficient current however, flows to maintain the voltage regulator V in actuated condition as long as the controller lever remains in this position. It is a well-known fact that one-tenth of the current that is required to initially actuate an ordinary solenoid or magnet is sufficient to maintain the same in actuated condition after its core or armature has been once attracted. It is thus apparent that the voltage of the train wire 3 may be at once greatly reduced, and still maintain the voltage regulator V in actuated condition.

As will be pointed out in connection with the remaining figures of the drawing, this first rise in voltage upon the train wire 3 is sufficient to actuate the proper apparatus to properly connect the motors in the circuit to give the train its lowest speed.

The further rotation of the master-controller-lever 24 cuts out more of the controller resistance from the field circuit of the generator, and deënergizes the voltage regulator V when the brush 29 passes from the contact 33, thereby permitting its resistance 12 to be short-circuited, and the field winding 20 to be subjected to more current from the trolley circuit over the path before described. This results in immediately building up the magnetism of the field of the generator 18 thereby raising the potential of the train wire 3 to a higher degree than formerly. As the brush 29 of the controller-lever reaches the contact 34, a path for current similar to that formerly described as passing through the winding of the voltage regulator V is now established through the voltage regulator $V^2$ from the wire 59 over wires 63, 64 and 65; which current energizes the said regulator $V^2$, to cut the resistance 13 into the circuit of the field winding 20 of the generator 18 thereby again immediately cutting down the voltage of the train wire 3. This, as will be explained hereinafter, results in operating the desired apparatus to impart to the car motors, the second speed. The same operation is repeated with the further movement of the master controller lever 24, the voltage regulator $V^2$ being first deënergized, thereby allowing magnetism of the generator 18 to immediately build up, and when the contact 35 of the armature is reached by brush 29 of this lever, a third circuit is completed through the regulator $V^3$, by additional wires 66, 67 and 68, which as soon as the voltage rises upon the train wire to the desired amount, it cuts the resistance 14 into the field circuit of said generator, thereby again reducing the voltage of the train wire 3.

In case the train were to be moved in the opposite direction, the master controller lever 24 would be operated counter clockwise with the result that the same circuit in general would be established, and the same operation of the various parts would result, but the direction of the current flowing in the train wire would be reversed for the reason that the flow of current through the field winding of the generator 18 is in the opposite direction. This is apparent from an inspection of the circuit through the field winding which is now established, and which may be traced as before, from the trolley 5 over conductors 37 and 38, thence directly through the lower set of contacts of the master controller, thence by way of contact strip 25 upon the controller lever, the lower segment 27 of said controller, wires 56 and 55, thence through the field of the generator 18, wires 54 and 53, short-circuiting contacts 52, 51 and 50 of the voltage regulators V, V² and V³, wire 49, contact segment 26 of the controller, brush 28, hub of controller lever and by wires 58 and 43 to rail 2, this direction being exactly the reverse through the field winding, from that before described when the controller lever was moved in clock-wise direction. The same operation takes place when the master controller and starting box at the opposite end of the car are utilized, so that the car may be operated from either end.

Turning now to Fig. 2, which illustrates the solenoid switches utilized for making the various motor connections, but shows only the various windings of these solenoids and the circuit controlling the same, it will be seen that there are a plurality of magnetic switches preferably of the solenoid type, those designated D, D², etc., controlling the direction of the flow of current through the motors, and may be termed the reversing or direction controlling switches; those designated R, R², etc., controlling the inclusion and exclusion of the motor starting resistances; those indicated by letters P, P², having to do with the parallel connection of the motors, at each end of the car, and that indicated by the character S, controlling the series relation of said motors. These several switches have their circuits controlled by means of a relay X. This figure illustrates the apparatus that is directly affected by the variations of voltage upon the train wire. The train wire and rail as well as the trolley are also shown in this figure, and it will be understood from the previous figure that circuits established between the train wire and rail are completed through the wire 43, wire 42, lever 22 and contact 47, conductors 4 and 46, and thence to armature 19 of generator 18, back to the train wire, as shown in full in Fig. 1.

As indicated in Fig. 2, the switches D, D², etc., have each a winding permanently connected between the trolley 5 and the rail 2 by conductors 69, 70 and 71, although the current flowing therethrough is not alone sufficient to energize said switches. When a voltage is impressed upon the train wire 3, current passes by wires 72 and 73 through the lower windings of each of these reversing switches or direction controlling solenoids, at the left, and by corresponding wires 74 and 73 through similar windings upon the switches D⁵, D⁶, etc., at the right and thence by conductors 75, contact 76, stem 77, and contact lever 78 of solenoid switch P, and thence by way of conductor 79 to rail 2. The lower windings upon solenoids D³, D⁴, are in opposite direction from the top windings upon said switches, and hence if the current flowing from the train wire through these lower windings is in the same direction with that flowing from the trolley to the rail through the top windings their magnetism will assist each other and the solenoid plungers will be attracted and the switches operated. While the plungers controlled by the corresponding windings, upon the other two switches D and D², will not be attracted because the current flowing through the windings of each will be opposite, and will tend to neutralize each other. It is evident also, that if the current in the train wire is reversed, the solenoids D, D² will be operated, while solenoids D³ and D⁴ remain in their normal position. The corresponding operation with reference to the solenoids at the opposite end of the car, of course takes place, each set of solenoids constituting the reversing switch mechanism for the driving motors at the corresponding ends of the cars. A suitable mechanical interlocking mechanism comprising a bar 80 and levers 81 attached to the pivoted contact arms of the solenoid switches and having pin and slot connections with said bar, is provided to prevent both pairs of solenoids at each end of the car being operated at the same time, and thereby short-circuiting the driving motors, or otherwise altering circuit conditions.

The driving motors at the two ends of the car are in the present system, arranged to be driven at three different speeds; the first speed being that obtained when both motors are connected in series with all of the resistance in circuit therewith; the second, that in which the two motors are in series but with all of the resistance cut out of the circuit, and the third, that obtained when the motors are connected in parallel with each other between the trolley and the rail with all of the resistance cut out of the circuit.

As we have seen, the impression of voltage upon the train wire results in operating the reversing switches D, D², etc., according to the direction of current upon the train wire in a similar manner to direct current through the motors in one direction or the other. At the same time the path for current through the series solenoid S is provided from the train wire 3 by conductor 82, 83 insulated contact 84 of the relay solenoid X, and thence by way of wire 85 insulated contact 86 of solenoid P², wire 87 to the non-insulated contact 76, stem 77, lever 78 of the solenoid P, and thence by way of conductor 79 to the rail 2.

So long as the voltage on train wire 3 is not allowed to increase above the limit at which the voltage regulator V is adjusted to respond, no more solenoid switches than those above mentioned will become sufficiently energized to attract their plungers.

This state of affairs represents the lowest running speed of the train in which, as stated above, the two motors are connected in series with all of the resistance in circuit.

The second running speed of the train is obtained by further increase of voltage on train wire 3, which then becomes sufficiently great to energize the windings of solenoid switches R, $R^2$, $R^3$ and $R^4$. The current for this operation may be traced from train wire 3 over conductor 88, thence in parallel through windings of the two switches R and $R^2$, to the conductor 89, wire 90, thence by way of insulated contact 91, carried by the stem of the relay X, thence over conductor 85 insulated contact 86, conductor 87, non-insulated contact 76, stem 77, lever 78 of solenoid P, thence by way of conductor 79 to the rail 2. A similar path for current is provided through switches $R^3$ and $R^4$, at the other end of the train, over conductor 92, thence in parallel through the two windings of said switches by conductors 89 and 90 over the path just traced. The operation of these four switches serves to cut out the resistance from the circuit of the driving motors allowing them to assume their greatest speed when connected in series with each other.

The third or maximum running speed is now obtained by further increase of voltage on train wire 3, which produces a number of changes in the various relative positions of the solenoid switches. The first apparatus to respond to this further increase of voltage on the train wire is relay X, the winding of which is permanently connected to the train wire 3, by conductor 93, while its other terminal is directly connected with the rail 2 by conductor 94. This relay then attracts its plunger and lifts its two insulated contact plates 84 and 91, thereby making the following alterations in the circuit connections. The lifting of the contact 84 opens the circuit through the series solenoid S, thereby deenergizing the same and the lifting of the contact 91 opens the circuit through the resistance solenoids R, $R^2$, etc., which are also deënergized. At this time the driving motors are entirely disconnected from the trolley and the rheostatic starting resistance of said motors has been inserted into their armature circuits. At the same time, contact 91 of the said relay X engages its upper contacts which close at one point the path for current through the paralleling switches P and $P^2$, the second break in said path being closed by the switch S when deënergized. This path for current may be traced from the train wire 3 over conductor 95, to one terminal of the solenoid P, thence by conductor 96 to the first terminal of the solenoid $P^2$, thence by conductor 97 insulated contact 98 of the series solenoid S, conductor 99, insulated contact 91 of the relay X, and by way of conductor 94 to the rail 2. These switches P and $P^2$, are now energized, the latter lifting its contact 86 to open the circuit through conductors 85 and 87, and the former lifting its contact 76 into engagement with the corresponding upper contacts to complete a path for current from the wire 89 through a resistance 100 and over conductor 101 thence by contact 76, and wire 79 to the rail 2. The completion of this path results in the energizing of resistance relays R, $R^2$, $R^3$ and $R^4$ before described. As a result of these changes the two sets of motors are now connected in parallel between the trolley and the rail by the operation of the switches P and $P^2$, and the resistance is cut out of their circuits by the operation of switches R, $R^2$, $R^3$ and $R^4$. This results in the condition necessary for the maximum running speed of the driving motors. During the operation of the switch P, the path for current through the reversing switch lower windings is maintained through a resistance 102 interposed between conductors 75 and 79, which resistance serves as a further precaution against overheating the said windings of the reversing switches. Resistance 100 may be made of such an amount that the solenoid switches R, $R^2$, etc., will become sufficiently energized to attract their plungers only when subjected to a still further increase of voltage on the train wire at which time they will cut out the starting resistance and the driving motors will then be left running in parallel connection with all the starting resistance removed from the circuit.

As was explained in connection with Fig. 1, it is evident that the windings of none of the solenoids are subjected to the voltage necessary to actuate them for any extended length of time, for as soon as this voltage has been applied, and the solenoids have responded thereto, the voltage regulators immediately cut down the voltage on the train wire leaving only a sufficient voltage thereon to allow the solenoids to retain their plungers in their uppermost positions. Of course, very much less current is necessary to accomplish this latter result than the amount required to actuate the solenoids when the plungers are in their initial positions.

The apparatus thus described constitute in effect an electrical interlocking mechanism, since it prevents the operation of the solenoid switches in any except the proper order. For instance, in changing over from the series to the parallel relation of the driving motors, it is necessary to first open the circuit of the motors, and before connecting them to the circuit in parallel relation, to interpose their starting resistance. Thus, the operation of the relay X opens both the circuit of the series solenoid S and of the resistance solenoids R, $R^2$, etc. Furthermore, the paralleling solenoids P and $P^2$, cannot become energized until the plunger of the series solenoid S has dropped and thereby closed the circuit of said paralleling solenoids. Having thus disconnected the driving motors from the circuit and re-introduced the starting resistance, it then becomes safe, and only then, to energize the paralleling solenoids P and P². In passing from the parallel relation to the series relation of the driving motors, it is also impossible for the winding of the series solenoid to become energized until both plungers of the paralleling solenoids have dropped, and thus closed the circuit of the series solenoid winding S. The plunger of the relay solenoid X is also obliged to drop before the circuit can be completed through the winding of the solenoid S. Thus, the operation of the various switches in a definite order is insured.

Figure 3:
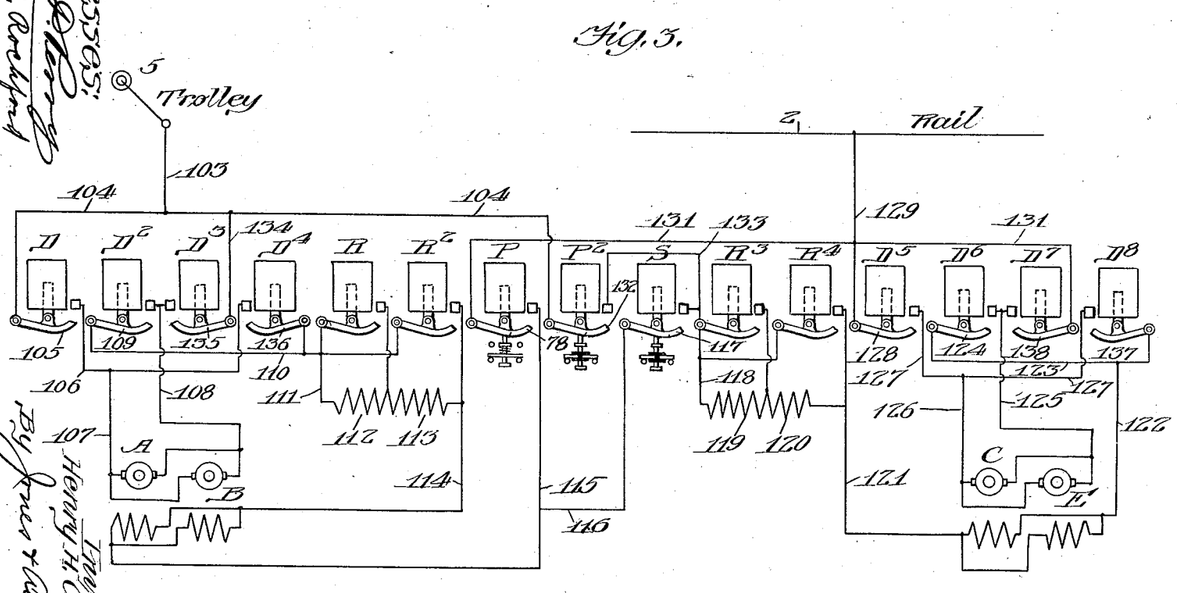
Fig. 3 is also a diagrammatic view illustrating the wiring and apparatus for accomplishing the various ways of connecting the driving motors, and thus affecting the speed of the train.

Referring to Fig. 3, wherein the driving motor connections are shown, it is apparent that as soon as solenoids D, D², D⁵ and D⁶ are operated which is the condition for the lowest speed, a path for current is completed from the trolley 5 over wires 103 and 104 to the post of the switch D, thence by its contact arm 105 to the conductor 106, and thence by conductor 107 through the armatures of the two driving motors A and B at the one end of the car, thence by conductor 108, contact arm 109 of switch D², conductor 110, wire 111, resistance sections 112 and 113, conductor 114, through the field windings of said motors A and B in parallel, thence over conductors 115 and 116 and contact 117 of the series solenoid S, conductor 118 resistance sections 119 and 120, conductor 121, field windings of motors C and E at the opposite end of the car, conductor 122 and 123, contact 124, of solenoid D⁶, conductor 125, thence through the armatures of the motors C and E in parallel over conductors 126 and 127, contact 128 of solenoid D⁵, and thence to the rail 2. The current flows over this path in series through the motor armatures and fields of the two motors, both motor sets being likewise in series and the resistances 112 and 113 as well as 119 and 120 are in circuit therewith.

At the next higher voltage upon the train wire 3, the resistance controlling switches R, R³, R² and R⁴ are operated as before explained to cut out the resistance in the motor circuits. These resistance controlling switches are adjusted so that they will respond or be operated in the order named as the train wire voltage increases, thus first cutting out the resistances 112 and 119 and thereafter the resistances 113 and 120. This condition results in the second speed of the driving motors.

When the third voltage of the train wire is attained, the solenoid S and the resistance controlling solenoids R, R², R³ and R⁴ are de-energized, and the paralleling solenoids P and P² are energized. The two sets of motors are now connected in parallel between the trolley and the rail, the circuit of that at the left being completed from trolley 5 over conductors 103 and 104, contact 105, conductors 106 and 107, armatures of motors A and B, conductor 108, contact arm 109 of switch D², conductor 110, through resistance 112 and 113, conductor 114, thence through the field windings of motors A and B, conductor 115, contact arm 78 of paralleling switch P, conductors 131 and 129 to the rail 2. The driving motor set at the opposite end of the car has its circuit completed from trolley 5 over conductors 103 and 104, contact arm 132 of paralleling switch P², conductors 133 and 118, resistances 119 and 120, conductor 121, the field windings of motors C and E, conductors 122 and 123, contact 124 of switch D⁶, conductor 125, the armatures of motors C and E, conductors 126 and 127, contact arm 128 of reversing switch D⁵, and by way of conductor 129 to the rail and other side of the circuit. This motor set is therefore also in direct circuit between the trolley 5 and rail 2, and both motor sets are operated in parallel. The resistances controlling solenoids R, R³, R² and R⁴ are immediately energized in the order named, and serve to cut out the resistance in two steps from each motor circuit, and permits the said motors to reach their third and maximum speed.

In order to reverse the travel of the car, it is merely necessary to reverse the current flowing in the train wire, which results in de-energizing reversing switches D, D², D⁵ and D⁶, and energizing the other reversing switches D³, D⁴ D⁷ and D⁸. This, in no wise affects the other circuits, and merely results in changing the direction of the curernt flow through the armatures of the motors, the current at the same time flowing in the same direction as before, through the field windings of said armatures. This effect may be understood by tracing the circuit from the trolley 5 over conductors 103 and 104, thence by way of conductor 134, contact arm 135 of switch D³, conductor 108 and thence in reverse direction through the armatures of motors A and B, conductors 107 and 106, contact arm 136 of switch D⁴, conductor 110, and thence through the field windings of the motor as before described. By following the circuit through the motor set at the opposite end of the car, it is apparent that a similar condition exists. For instance, passing through the field windings of motors C and E in the direction before described, and thence over wires 122 and 123, contact arm 137, conductor 127, wire 126, thence through the armatures of motors C and E in the reverse direction from that before described, and thence by way of conductor 125, contact arm 138, and conductors 131 and 129 to the rail.

Any suitable form of solenoid or other electro magnetic switches may be employed and any desired type of motors, controllers and starting boxes may be utilized.

It is obvious that the invention may be utilized for other purposes than those described, as for instance, the controlling of one or more motors at a distance, by the use of only one wire between the controlling point and the said motors, and that various alterations and changes may be made in the various details of construction and arrangement without departing from the spirit or scope of the invention.

Figure 4:
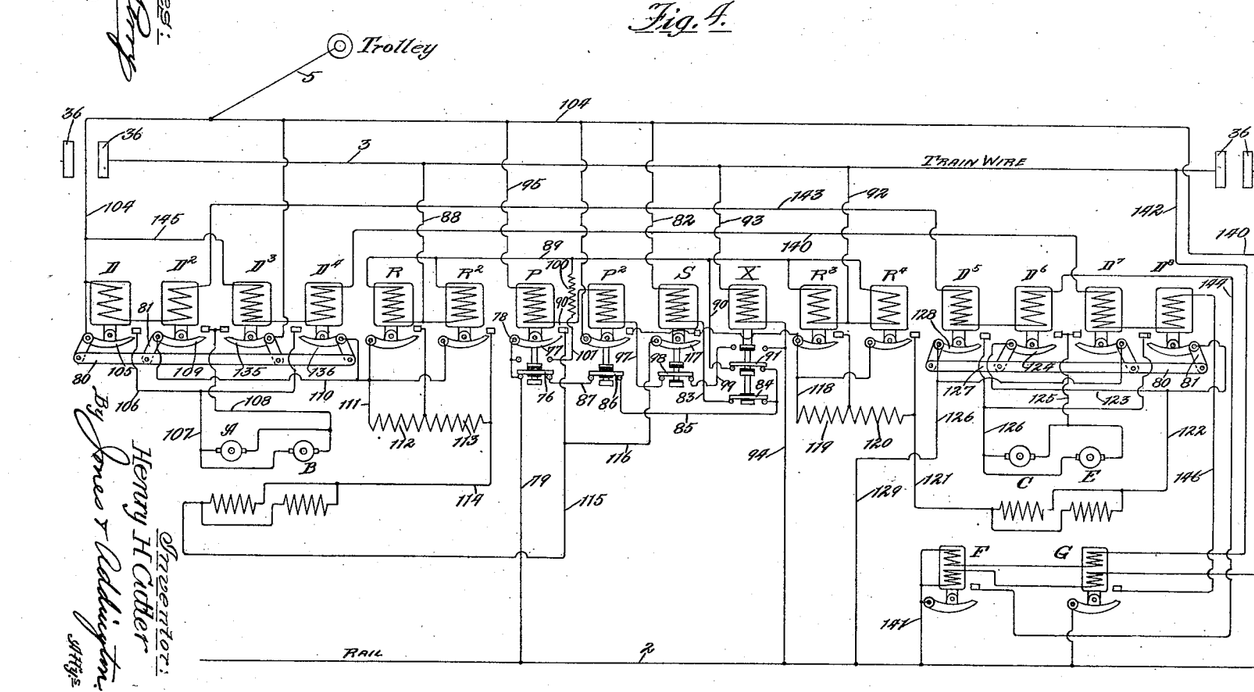
Fig. 4 is a diagrammatic view of a modification of the system in which the sizes of the motor generator and reversing solenoids may be reduced and the windings of the latter simplified.

In Fig. 4, the arrangement and operation of the system are similar to that of the prior figures except that two additional relays F and G are provided to control the reversing switches D, D, etc., the latter being energized wholly from the trolley instead of partly from the train wire as in the former system, and the paralleling solenoids P and $P^2$, and the series solenoid S are also energized directly from the trolley, thereby requiring a less amount of current from the train wire 3 and permitting the use of much smaller motor generators, and a simplification of the windings of the solenoids of the reversing switches which are now simple windings instead of compound as in the former system.

These two relays F and G have each a winding, for instance the lower winding, connected permanently between the trolley 5 and rail 2, through the medium of wires 104, 140 and 141, the current in which is insufficient to cause the magnets to lift their cores. The upper windings are connected together and between the train wire 3 and rail 2 by means of conductors 142 and 141, the said upper windings upon one relay being wound in a direction opposite to the lower winding, and upon the other relay in the same direction as the lower winding. The adjustment of these windings is such that when the first or lowest voltage is applied to the train wire and their effects are added, the corresponding relay F or G is operated and its contacts closed, the other relay remaining unoperated on account of the opposing effects of the two windings. The windings upon relay F are shown opposed and those upon G in the same direction; therefore, when current flows in the train wire in the same direction as in the trolley, the relay G will be operated; but when the current in the train wire is opposed to that in the trolley, the relay F will be operated. In the latter condition, i. e., with current in the train wire opposite that in the trolley and hence the relay F operated, a path for current through reversing switch magnets D, $D^2$, $D^5$, and $D^6$ is completed from the trolley 5, wire 104, thence through switches D and $D^2$, conductor 143, switches $D^5$ and $D^6$, wire 144 closed contacts of relay F, and wire 141 to the rail 2. These switches control the forward movement of the train. When it is desired to move the train backward, the current in the train wire is in the same direction as in the trolley, and solenoid G attracts its plunger, thereby closing a path for current from the trolley, via wires 104, 145, through $D^3$ and $D^4$, wire 147, switches $D^7$ and $D^8$, wire 146, and the closed contacts of relay G to the rail 2. These switches control the backward movement of the train as before pointed out. The forward travel of the train is therefore accomplished by moving the controller lever 24 shown in Fig. 1, clockwise onto the first notch. At the same time current passes from train wire through the winding of the relay solenoid X, wire 94 to rail; but is not operated when the controller arm is on the first notch. Consequently, current can also pass from the trolley wire over wire 82, through the solenoid S, wire 83, insulated contact bridge 84 attached to the bottom of the plunger of relay solenoid X, thence over wire 85, insulated contact bridge 86 wire 87, insulated contact bridge 76, and wire 79 to the rail. Solenoid switch S is therefore energized, and its plunger attracted so as to connect the driving motors of both trucks in series relation, precisely the same as heretofore described.

A further increase in voltage on the train wire is obtained by moving the controller on the second notch, and as the voltage builds up, the resistance solenoids R, $R^2$ $R^3$ and $R^4$, cut out the starting resistance of the motors, and give the second running speed.

A still further increase in voltage on the train wire is obtained when the controller is moved to the third notch, which voltage is sufficient to enable the relay solenoid X to attract its plunger, thereby causing a very material change in the connections of the various solenoid switches, which can be traced as follows:—First, by the lifting of the insulated bridge 84 mechanically connected to the bottom of the plunger of relay solenoid X, the circuit is broken which previously included the winding of the solenoid S, thereby causing same to drop its plunger and help to close the circuit including the windings of the two solenoids P and $P^2$, by means of insulated bridge 98, carried upon the plunger of said solenoid S. A still further movement of the plunger of the solenoid X also opens the circuit which controlled the windings of the resistance solenoid R, $R^2$, $R^3$, and $R^4$, thereby causing same to drop their plungers and thus insert all of the starting resistance into the circuit of the motors. A still further movement of the plunger of solenoid X establishes a new circuit, which controls the windings of the two parallel solenoids P and $P^2$, which can be traced as follows:—Starting with the trolley wire 104, current passes through wire 95, thence through the windings of the solenoids P and P², wire 97, insulated contact bridge 98, wire 99, insulated contact bridge 91, wire 94 to rail. The two solenoids P and P² therefore attract their plungers and connect the motors of the two trucks in parallel relation, as previously described in Fig. 3. Attached to the bottom of the plunger of the solenoid P is an insulated bridge 76, which now makes contact with the two upper terminals shown, and establishes a new circuit including the windings of the resistance solenoids R, R², R³ and R⁴. Current for these resistance solenoids can now be traced, starting from the rail, over wire 79, contact bridge 76, wire 101, resistance 100 and wire 89 where the current passes both to the left and to the right, going through the windings of solenoids R, R², R³ and R⁴, respectively, thence directly to the train wire only, by wires 88 and 92. The voltage of the train wire is then increased sufficiently to energize the windings of the solenoids R, R², R³, and R⁴, giving the full running speed of the train.

Practically the only difference between the system of Fig. 4 and the former system previously explained in connection with Figs. 1, 2 and 3, is the substitution of the relays F and G, and the modified circuit connections used in connection with all of the other solenoid windings, with the exception of the resistance solenoids R, R², R³ and R⁴.

To back the train, the controller handle is moved counter clockwise and the apparatus will operate as before described to suitably drive the train at the desired speed.

From the foregoing, it will be apparent that the motor generators may be greatly reduced, practically to one third the size of the former sets, the size of the solenoids of the reversing switches may be decreased and their windings simplified and the arrangement of the wiring upon the cars may be simplified. Other changes, alterations and substitutions may also be made without departing from the spirit or scope of the invention.

It will be obvious that the control of the motors may be rendered independent of the fluctuations of current, as well as of voltage, and it will be understood in the claims, where I have used the term "electrical conditions," that this term is intended to embrace either voltage or current.

Having thus described my invention, what I claim as new, and desire to secure by Letters Patent, is:—

1. The combination with a controlling circuit subject to fluctuations in the electrical conditions thereof, of an electromagnetic device controlled by predetermined variations in the electrical conditions in the controlling circuit, and means for rendering the control of said device independent of said fluctuations.

2. The combination with a controlling circuit subject to fluctuations of voltage, of electromagnetic devices controlled by predetermined variations in the electrical conditions of the controlling circuit, and means for rendering the control of said devices independent of said fluctuations.

3. The combination with a controlling circuit subject to fluctuations in the electrical conditions thereof, of electromagnetic devices controlled by different voltages upon said controlling circuit, and means for rendering the control of said devices independent of said fluctuations.

4. The combination with a controlling circuit subject to fluctuations of voltage, of electro-magnetic devices controlled by different voltages upon said controlling circuit, and means for rendering the control of said devices independent of said fluctuations.

5. The combination with a controlling circuit subject to fluctuations in the electrical conditions thereof, of electromagnetic devices controlled by variations in the electrical conditions of the motor circuit, and means for operating said devices independent of said fluctuations.

6. The combination with a controlling circuit subject to fluctuations of voltage, of electromagnetic devices controlled by variations in the electrical conditions of said controlling circuit, and means for operating said devices independent of said fluctuations.

7. The combination with a controlling circuit subject to fluctuations of the electrical conditions thereof, of electromagnetic devices controlled by variations of voltage upon the controlling circuit, and means for operating said devices at the desired voltages independent of said fluctuations.

8. The combination with a controlling circuit subject to fluctuations of voltage, of electro-magnetic devices controlled by variations of voltage upon said controlling circuit, and means for operating said devices at the desired voltages independent of said fluctuations.

9. The combination with a controlling circuit subject to fluctuations in the electrical conditions thereof, of electromagnetic devices connected with said circuit operated by variations in the electrical conditions thereof, and means for rendering the control of said devices independent of the fluctuations upon said circuit.

10. The combination with a controlling circuit subject to fluctuations of voltage, of electromagnetic devices connected with said circuit operated by variations in the electrical conditions thereof, and means for rendering the control of said devices independent of the fluctuations upon said circuit.

11. The combination with a controlling circuit subject to fluctuations in the electrical conditions thereof, of electromagnetic devices connected with said circuit operated by variations of voltage thereon, and means for rendering the control of said devices independent of the fluctuations upon said circuit.

12. The combination with a controlling circuit subject to fluctuations of voltage, of electro-magnetic devices connected with said circuit, operated by variations of voltage thereon, and means for rendering the control of said devices independent of the fluctuations upon said circuit.

13. The combination with a controlling circuit upon which fluctuations of voltage are caused by the fluctuations in a supply circuit, of means for varying the voltage at will upon said controlling circuit, electro-magnetic devices responsive to the different voltages upon said controlling circuit, and means for rendering the operation of said devices at the desired voltages independent of the fluctuations upon the controlling circuit.

14. The combination with a supply circuit upon which fluctuations of voltage occur, of a controlling circuit, electro-magnetic devices connected to the latter circuit and responsive to variations of voltage thereon, and means for rendering the operation of the latter devices at the desired voltages independent of said fluctuations of the supply circuit.

15. The combination with a supply circuit upon which fluctuations of voltage occur, of a motor generator of which the motor is connected with said supply circuit and operated therefrom, a controlling circuit to which the generator portion of said motor generator is connected to supply current thereto, electro-magnetic devices connected to the latter circuit and responsive to the variations of voltage thereon, means for varying the voltage of current upon the controlling circuit, and means for rendering the operation of the said devices at the desired voltages independent of said fluctuations of the supply circuit.

16. The combination with a supply circuit, upon which fluctuations of voltage occur, of a motor-generator of which the motor is connected with said supply circuit, and operated therefrom, a controlling circuit to which the generator portion of said motor generator is connected to supply current thereto, electro-magnetic devices connected to the latter circuit and responsive to the variations of voltage therein, means for controlling the output of the motor-generator to thereby vary the voltage impressed upon the controlling circuit, and means for rendering the operation of the latter devices at the desired voltages independent of the fluctuations of the supply circuit.

17. The combination with a supply circuit upon which fluctuations of voltage occur, of a motor generator supplied with operating current from said supply circuit, a controlling circuit to which the armature of the generator portion of said motor generator is connected and from which the said circuit is supplied with current, means for controlling the voltage delivered by the said generator to the controlling circuit, electro-magnetic devices connected with the latter current responsive to the different voltages thereon, and means for rendering the operation of said devices independent of the fluctuations of current upon the controlling circuit which are caused therein by fluctuations in the supply circuit.

18. The combination with a controlling circuit, of electro-magnetic windings connected therewith, means for impressing current of different voltages upon said circuit to affect said windings, and means for reducing the voltage of current upon said circuit after the said windings have been affected.

19. The combination with a controlling circuit, of electro-magnetic windings connected therewith, means for impressing current of different voltages upon said circuit to affect said windings, and means for automatically reducing the voltage upon the said circuit after said windings have been affected.

20. The combination with a controlling circuit, of electro-magnetic windings connected therewith, means for impressing current of the desired voltage upon said circuit to affect said windings, and means for causing the automatic reduction of said voltage upon the said circuit as soon as the said windings have been affected.

21. The combination with a controlling circuit, of electro-magnetic windings connected therewith, responsive to different voltages, means for impressing different voltages upon said circuit, and means for reducing the voltage upon said circuit after the said windings have responded.

22. The combination with a controlling circuit, of electro-magnetic windings connected therewith responsive to different voltages, means for impressing different voltages upon said circuit, and means for securing the automatic reduction of voltage upon said circuit after the said devices have responded thereto.

23. The combination with a controlling circuit, of electro-magnetic devices connected therewith responsive to different voltages, means for impressing upon the controlling circuit current of different voltages to suitably actuate said devices, and means for causing the automatic reduction of voltage upon said circuit after the operation of the said devices at each change of voltage.

24. The combination with a controlling circuit, of a plurality of electro-magnetic switches connected therewith, some of said switches responding to one voltage of current upon said circuit, and others at a different voltage, means for impressing current of the proper voltages upon said circuit, and means for automatically reducing voltage as soon as the respective devices have been operated by the different voltages.

25. The combination with a plurality of motors, of electro-magnetic switches for controlling said motors, a controlling circuit from which said electro-magnetic switches are controlled, and means for automatically reducing the voltage upon said circuit as soon as the said switches have been suitably operated.

26. The combination with one or more electric motors, of electro-magnetic switches to control the speed and direction of operation of said motors, said switches being responsive to different voltages of operating current, a controlling circuit, means for impressing different voltages upon said controlling circuit to thereby suitably control the operation of said switches, and means for causing the automatic reduction of voltage upon said controlling circuit and thereby in the windings of said switches as soon as said switches have responded to their respective voltages.

27. In a multiple-unit-train-control system, the combination with a plurality of cars, of driving motors for the cars, electro-magnetic switches upon each car to suitably control the respective motors, said switches being operated according to the different voltages impressed upon the controlling circuit, means for impressing at will the different voltages upon said controlling circuit, and means for automatically reducing the voltage upon said circuit and through the windings of said switches after each operation of the same at the different voltages.

28. The combination with a controlling circuit, of a plurality of electro-magnetic devices connected therewith and responsive to the different voltages thereon, means for impressing the different voltages upon said circuit to secure the desired operation of said devices, and electro-magnetic means operated at the different voltages to automatically reduce the voltage upon said circuit.

29. The combination with a plurality of electric motors, of electro-magnetic switches to suitably control the operation of the same, a controlling circuit to suitably control the operation of said switches by different voltages thereon, switching mechanism under the control of an operator to enable him to impress different voltages upon the controlling circuit, and automatic switches associated with the controlling circuit to reduce the voltage upon said circuit as soon as the proper switches have been operated.

30. The combination with a controlling circuit subject to fluctuations of voltage, of electro-magnetic devices controlled by different voltages upon said controlling circuit, and means for automatically checking the rise or reducing the voltage upon said circuit as soon as the desired devices have been suitably operated, whereby the remaining devices connected with said circuit are not affected by said fluctuations of voltage.

31. The combination with one or more electric motors, of electro-magnetic switches to control the operation of said motor or motors, said switches being responsive to different voltages of operating current, a controlling circuit for controlling the operation of said switches, means for impressing the desired voltages upon the controlling circuit, and means for securing the automatic reduction of voltage upon said controlling circuit after each operation of the desired switches, whereby the operation of said switches is rendered independent of any fluctuations of voltage that may occur in the controlling circuit.

32. In a multiple-unit-train-control system, the combination with a plurality of cars, of driving motors for the cars, means for suitably controlling the operation of the motors upon all the cars from one car only, said means including one wire only between the various cars and extending throughout the train, and automatic couplers for said wire between the cars.

33. In a multiple-unit-train-control system, the combination with a plurality of cars, of driving motors for the cars, a train wire extending throughout the train, and means for suitably controlling the direction of rotation of the motors and their speed of operation by the direction of current and the variation of voltage upon said train wire.

34. In a multiple-unit-train-control system, the combination with a plurality of cars, of driving motors for the cars, electro-magnetic switches upon each car to suitably control the direction and speed of operation of the motors of the respective cars, a controlling circuit consisting of a single train wire extending throughout the train and between the cars, and means for controlling the current upon said train wire to suitably control said switches.

35. The combination with one or more motors, of electro-magnetic switches to control the operation of said motor or motors, said switches being responsive to different strengths of current, a controlling circuit by means of which said switches may be controlled from one point, means for at will impressing upon said circuit current of the different voltages to suitably cause the operation of said switches, and means for automatically reducing the strength of current upon the controlling circuit as soon as the proper switches have been operated at the different voltages, said controlling circuit consisting of one wire only extending between said one point and the switch.

36. In a multiple-unit-train-control system, the combination with a plurality of cars provided with driving motors of electromagnetic switches upon each car to control the respective motors, a controlling circuit including one wire only between the cars from which the operation of said switches is suitably controlled, means for impressing the desired strength of current upon said wire to suitably control the operation of said switches, and means whereby the strength of current is automatically reduced upon said circuit after each operation of the said switches.

37. In a multiple-unit control system, a single pilot-wire extending throughout the train, and branch connections in the several cars for securing forward, stop, or reverse conditions of the car-motors by varying the potential of said pilot-wire.

38. In a multiple-unit control system, a single pilot-wire extending throughout the train, magnetic devices within the several cars for controlling the motor-circuits thereof, and branch connections from said pilot-wire for arranging said motor-circuits in any desired relation by varying the potential of said pilot-wire.

In witness whereof, I have hereunto subscribed my name in the presence of two witnesses.

HENRY H. CUTLER.

Witnesses:
T. E. BARNUM,
J. F. HAWKINS.